Figure 3:
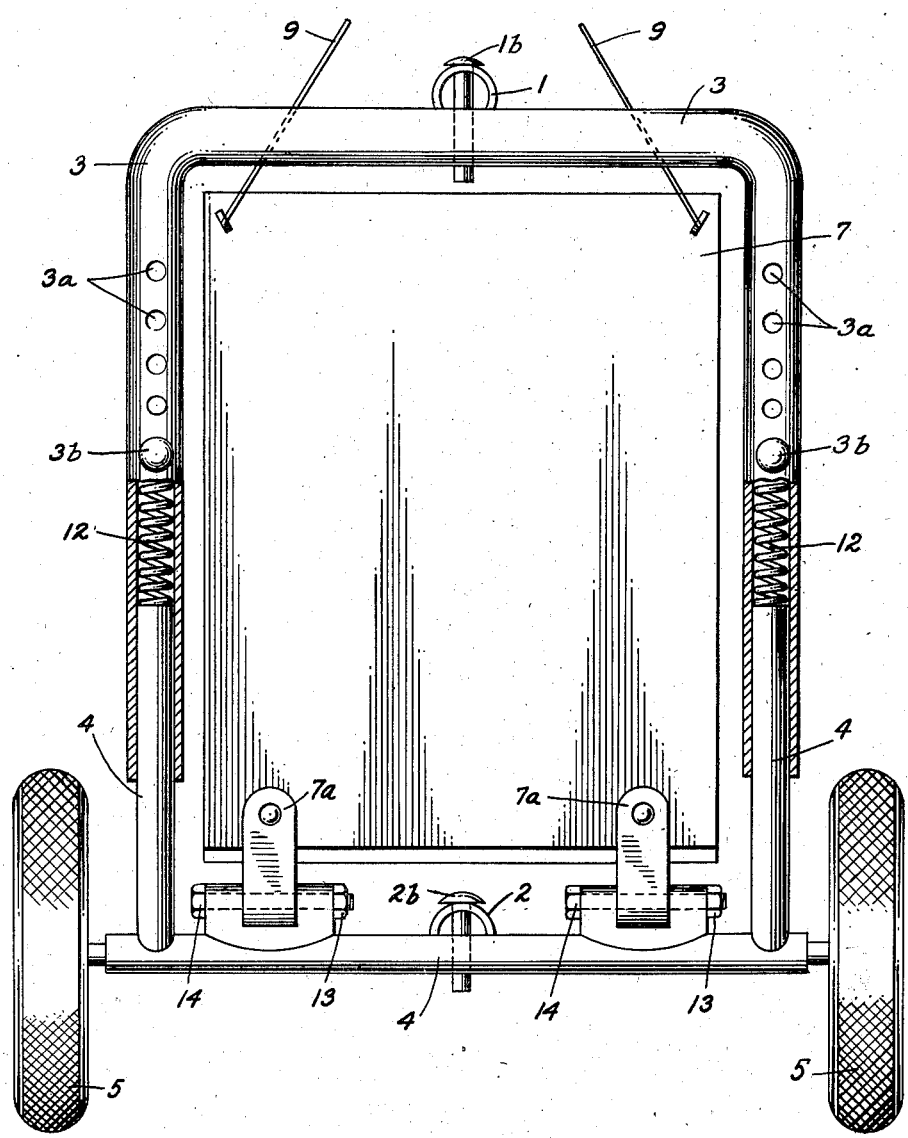

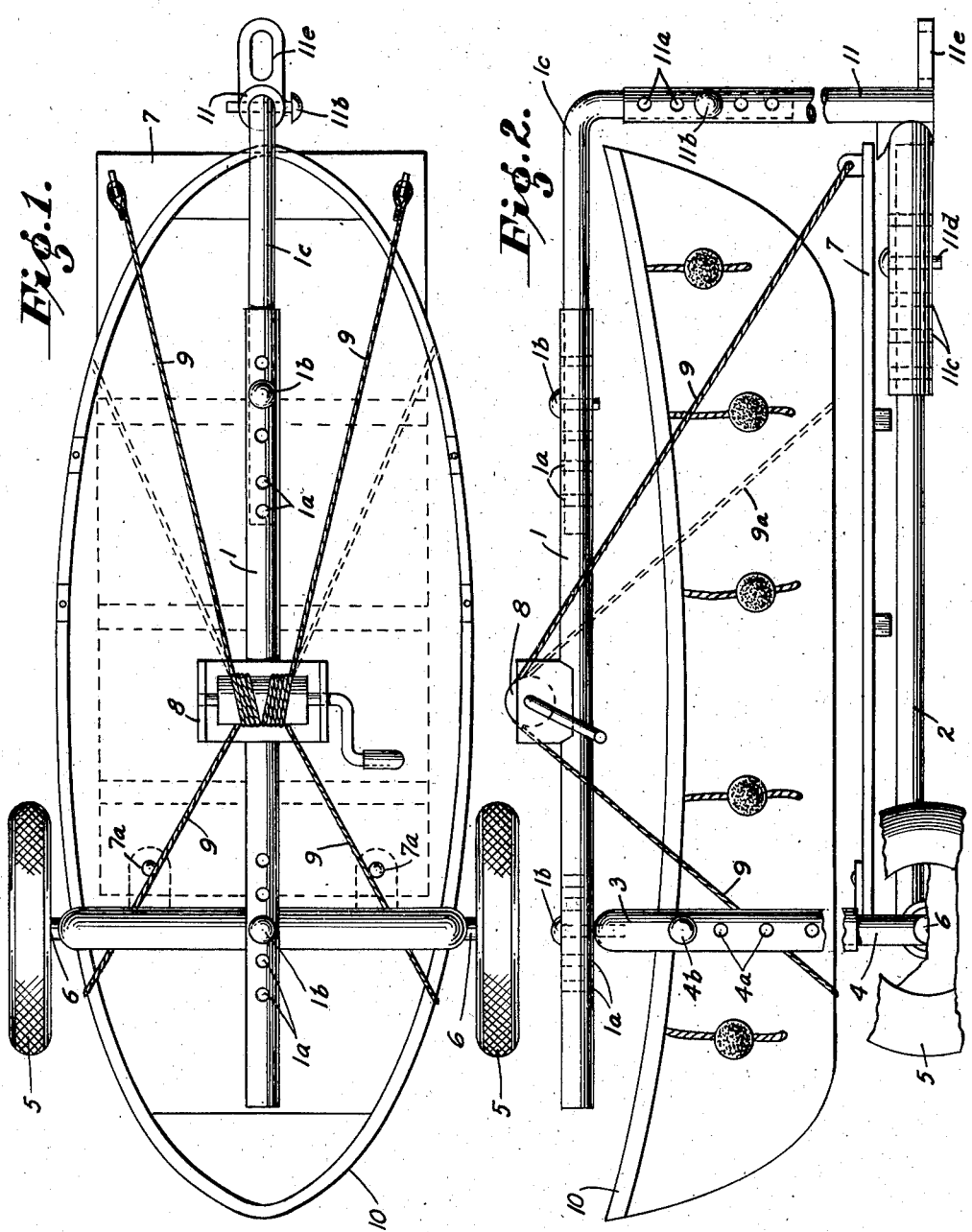

June 29, 1948.   B. O. SANFORD   2,444,231
TWO WHEEL BOAT TRAILER
Filed June 21, 1946   2 Sheets-Sheet 2

INVENTOR.
Burpee Owen Sanford

Patented June 29, 1948

2,444,231

UNITED STATES PATENT OFFICE 2,444,231

TWO-WHEEL BOAT TRAILER

Burpee Owen Sanford, Braintree, Mass.

Application June 21, 1946, Serial No. 678,439

2 Claims. (Cl. 214—65)

This invention relates to improvements in two-wheel trailers of the type designed to carry boats along a highway; and has as one of its major objects to provide means in such a trailer to carry a heavy boat having a broad beam, the said means pertaining to the spring construction in the trailer.

Another object of this invention is to divide the pulling strain on the trailer by providing spaced superimposed draft tongues, the said tongues being slidable.

Another object of this invention is to provide a trailer with a floor suitable for carrying duffel bags and gear pertaining to the boat, the said floor being constructed for dumping.

Another object of this invention is to provide a a trailer constructed for heavy duty, and which is substantially demountable in all its parts.

Another object of this invention is to provide this trailer with a hand operated winch and cables for securing the boat to the trailer in such a manner as to take full advantage of the buoyancy of the boat when the trailer is being withdrawn from the water.

For these objects and other objects that shall become evident, I shall now describe and show, first in limited form, and then in full detail, the construction and combinations of my improvements and the manner in which the same is to be made and used.

It is well known that when a boat is loaded on a trailer in preparation for hauling the boat out of the water that the first strain on the trailer draft tongue puts a severe strain on the trailer axle, this is especially true if the wheels have sunk into mud or happen to be behind raised rocks on the bottom. Thus I have experienced the main longitudinal member of a trailer being torn apart from the axle due to the strain in such a situation.

According to my present improvement, I provide spaced superimposed longitudinal members to the axle of my trailer, whereby a lifting force may be exerted on the axle of the trailer, the said force being in a substantially vertical direction, and whereby the wheels may be extricated from the mud or raised over projecting rocks.

Again, I have found that the springs on most trailers provide a problem when a boat having a broad beam, high sides and considerable weight is being hauled along a highway. While springs may be constructed as heavily as is necessary, the means of securing the springs on most trailers has left much to be desired. My present improvement provides for vertical springs which are protected in their motion as well as guided in their motion, and which also are adjustable.

Referring now to the drawings, Fig. 1 is a plan view of my improved trailer, Fig. 2 is a side elevation of the trailer, and Fig. 3 is a rear elevation. In Figs. 1 and 2 is shown a boat of the heavy lifeboat type mounted on the trailer in readiness for hauling along a highway or, in readiness for being launched into the water; and in which figures, respectively is shown the upper, vertically-spaced longitudinal member 1 and the lower longitudinal member 2, the said members being tubular and extendable.

Again, referring to Figures 1 and 2, respectively, is shown a tubular arch member 3 secured at its mid-point to, and transverse of the said longitudinal member 1. Further is shown one of the legs 4 of an inverted arch member comprising the axle and two vertically directed legs, the said legs being adapted for slidable engagement and securement in the dependent legs of the said arch member 3. Now further is shown the trailer wheels 5 mounted on the said axle 6.

Further in Figures 1 and 2 is shown a trailer floor 7 having hinges 7a, 7a secured to the said axle 6 providing means to raise the right extremity of the said floor for the purpose of dumping the floor. Further is shown a winch 8 and forward cables 9, 9 for raising the said trailer floor 7, and is shown the alternate positions of the forward cables in dotted lines at 9a, 9a, the said alternate position of the cables shown supporting the right extremity of the boat, and is shown the rear cables 9, 9 supporting the left extremity of the boat.

In the operation of my improved trailer I wish to show that in the steps of taking a boat out of the water, the cables are fully extended into two wide loops, the trailer is then backed into the water for a distance sufficient to permit the boat to float into the trailer and over the trailer floor to the position shown in Fig. 2. The cables are now taken up until they are just taut, whereby the cables gently guide the boat and pull it slowly along in its position in the trailer as the trailer is now slowly pulled toward the edge of the water. At this point there is very little tension on either the cables or the axle. As the trailer is drawn to the shore, it can be seen that the cables would ordinarily become more taut and greater weight would be put on the axle of the trailer; the winch, however, is permitted to let out cable as the trailer comes up relative to the boat; thereby permitting the fastest adjustment of the boat to the trailer, and permitting the minimum necessary weight on the axle of the trailer at all times.

Again, I have experienced great difficulty in unloading heavy boats of the life-boat type from trailers. In unloading my improved trailer, referring to Fig. 2, all the cables are loosened and the longitudinal member 1 including the winch 8 are raised by hand by upwardly adjusting the slidable legs of the arch member 3 and the downwardly projecting forward leg of the said longitudinal member 1. The right extremity of the hinged trailer floor 7 is now raised by means of the said winch, and the boat may be made to slide gently from the trailer.

I shall now show in full detail and describe in full detail the construction and combinations of my invention and the manner in which the same is to be made and used.

In Figures 1 and 2 is shown, respectively, the usual means for extending the members of the frame; and is shown the upper longitudinal member 1 comprising a tubular member having a plurality of holes 1a, 1a adapted for alignment in similar holes in the forward member 1c at the right extremity and in the arch member 3 at the left extremity. Further is shown bolts 1b, 1b adapted to be passed into the said aligned holes.

Further is shown the same construction employed to extend the legs of the arch members supporting the wheels; and is shown the arch member 3 having downwardly directed legs, and the inverted arch member 4 having legs directed upwardly. Further is shown a plurality of holes 4a adapted for alignment with similar holes in the downwardly directed legs of the said arch member 3. Again is shown a bolt 4b adapted to be passed into the said aligned holes.

Further is shown a right-angle tubular member 11 having multiple holes 11a and 11a being adapted for alignment with similar holes in the forward tubular member 1c and the tubular member 2. Further is shown bolts 11b and 11c adapted to be passed into the said aligned holes, respectively. Further is shown a draft tongue 11e having a hole for the passage of a bolt for the purpose of securing the trailer to a truck or other prime mover.

Figure 3 is a rear elevation of my trailer, and in which figure is shown the upper longitudinal member 1 and the lower longitudinal member 2, the said members being vertically spaced, and is shown the arch member 3 having downwardly directed legs, the said arch member 3 being secured to the upper longitudinal member 1 by means of a bolt 1b passing thru aligned holes in the two said members.

Again in Fig. 3 is shown the inverted arch member 4 comprising the axle and two upwardly directed legs, the said axle and legs being tubular, the said legs being adapted for sliding engagement within the downwardly directed legs of the arch member 3.

Further in Fig. 3 is shown the ground wheels 5, 5 mounted on the axle member 4. Further is shown the trailer floor 7 having hinges 7a, 7a secured to the said axle member 4. Again is shown the lower longitudinal member 2 secured to the said axle member 4 by means of a bolt 2b passed thru aligned holes in the said member 2 and the said axle member 4.

Now further in Fig. 3 is shown coiled vertical springs 12, 12, the said springs being positioned in the downwardly directed legs, respectively, of the said arch member 3 and, on top of the upwardly directed legs, respectively, of the said inverted arch member 4. Further is shown multiple holes 3a in the downwardly directed legs of the said arch member 3; and is shown bolts 3b, 3b adapted to be passed thru the said holes 3a, 3a, the said bolts preventing movement of the springs 12, 12 above the position of the said bolts. Further is shown the forward cables 9, 9 employed to raise and lower the trailer floor, now shown in raised position.

It can be seen therefore that the springs of my trailer have the protection and guidance of the downwardly directed legs of the arch member 3; further that the springs are adapted to varying loads by adjusting the said bolts in the legs of the arch member 3.

Again in Fig. 3 is shown the trailer floor 7 secured to the axle member by means of demountable hinges 7a, the said hinges being secured to the axle by means of the demountable screw-bolts 14, 14 and nuts 13, 13, respectively.

In the operation of my trailer, the trailer floor may be either mounted or demounted, and further, when the trailer has assumed the load to be carried, the springs become compressed immediately to the proper size, whereupon the said bolts may be quickly positioned above the springs, and the trailer becomes properly sprung for the highway transport of the particular load.

I am aware that prior to my invention, boat carrying trailers having tubular and extendable members have been known, I therefore do not claim such combinations broadly. I am aware that prior to my invention, boat carrying trailers having transverse arch member supports as shown, for example, in the U. S. Patent No. 2,375,754 to Ballinger, have been known, I therefore do not claim such combinations broadly. I am aware that prior to my invention, boat carrying trailers having trailer floors as shown, for example, in the U. S. Patent No. 2,361,951 to Livermon, have been known, I therefore do not claim such combinations broadly.

Obviously I do not wish to be limited to the exact details of construction as herein described and shown, as these may be varied within the limits of the appended claims without departing from the concepts of my improvements.

I claim:

1. In a trailer for transporting a boat, a frame comprising a pair of vertically spaced longitudinal members, a vertical member maintaining the forward ends of said longitudinal members in spaced relation, a transverse arch member supporting the upper said longitudinal member, the said arch member having its legs directed downwardly, a second inverted arch member supporting the lower said longitudinal member and having its legs directed upwardly and adapted for sliding engagement within the downwardly directed legs of the first said arch member, spring members positioned within the said downwardly directed legs and above the said upwardly directed legs, adjustable means to secure the said spring members from upward movement, a floor hinged at one extremity to the axle portion of the said inverted arch member and having its other extremity adapted to be raised or lowered by means of a winch and cable, the said winch being secured to the upper said longitudinal member, the said inverted arch member being supported by a pair of ground wheels.

2. In a trailer for transporting a boat, a frame comprising a pair of vertically spaced longitudinal tubular members, the said members being extendable, a vertical tubular member maintaining the forward ends of said longitudinal members in spaced relation, a tubular transverse arch member supporting the upper said longitudinal member, the said arch member having its legs directed downwardly, a second tubular inverted arch member supporting the lower said longitudinal member and having its legs directed upwardly and adapted for sliding engagement within the downwardly directed legs of the first said arch member, spring members positioned within the said downwardly directed legs and above the said upwardly directed legs, adjustable means to secure the said spring members from upward movement, a floor hinged at one extremity to the axle portion of the said inverted arch member, the said floor adapted to be mountable or demountable from the said axle portion, the said inverted arch member being supported by a pair of ground wheels.

BURPEE OWEN SANFORD.

REFERENCES CITED

The following references are of record in the file of this patent:

UNITED STATES PATENTS

| Number | Name | Date |
| --- | --- | --- |
| 1,531,180 | Erickson | Mar. 24, 1925 |
| 2,296,611 | Green | Sept. 22, 1942 |
| 2,388,870 | Sackett | Nov. 13, 1945 |
| 2,389,338 | Zorc, Jr. | Nov. 20, 1945 |
| 2,405,299 | Godwin | Aug. 6, 1946 |